(12) United States Patent
Higuchi et al.

(10) Patent No.: US 7,028,548 B2
(45) Date of Patent: Apr. 18, 2006

(54) VIBRATION TYPE ANGULAR VELOCITY SENSOR

(75) Inventors: Hirofumi Higuchi, Okazaki (JP); Takeshi Ito, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/811,877

(22) Filed: Mar. 30, 2004

(65) Prior Publication Data

US 2004/0187577 A1    Sep. 30, 2004

(30) Foreign Application Priority Data

Mar. 31, 2003  (JP)  ............... 2003-096803
Jan. 27, 2004  (JP)  ............... 2004-018500

(51) Int. Cl.
*G01P 9/04* (2006.01)

(52) U.S. Cl. .................. 73/514.12; 73/504.16

(58) Field of Classification Search ............ 73/504.02, 73/504.04, 504.12, 504.14, 504.15, 514.32; 310/316.01
See application file for complete search history.

(56) References Cited

U.S. PATENT DOCUMENTS 5,220,833 A * 6/1993 Nakamura ............... 73/504.12
5,581,142 A * 12/1996 Terajima ................. 310/316.01
6,769,304 B1 * 8/2004 Platt et al. ................ 73/514.32
6,817,244 B1 * 11/2004 Platt ........................ 73/504.16
6,862,934 B1 * 3/2005 Weinberg et al. ........ 73/504.12

FOREIGN PATENT DOCUMENTS

JP    2001-153659    6/2001
KR    1998-071552    10/1998
KR    2002-0007165   1/2002

OTHER PUBLICATIONS

Notice of Rejection/Communication from Korean Patent Office in Korean application No. 10-2004-0021836 which is a counterpart Korean application of U.S. Appl. No. 10/811,877 (English translation attached) mailed on Jul. 25, 2005.

* cited by examiner

*Primary Examiner*—Helen C. Kwok
(74) *Attorney, Agent, or Firm*—Posz Law Group, PLC

(57) ABSTRACT

To cancel in-phase components acting on vibrators of first and second sensor units in an angular velocity sensing direction Y, a differential amplification circuit obtains a differential waveform between a first angular velocity sensing waveform J1 and a second angular velocity waveform J2. Furthermore, to reduce a residual in-phase component of the obtained differential waveform, input gain adjusting circuits adjust an input gain of the first angular velocity sensing waveform J1 and an input gain of the second angular velocity sensing waveform J2 before these waveforms J1 and J2 are entered into the differential amplification circuit.

19 Claims, 12 Drawing Sheets

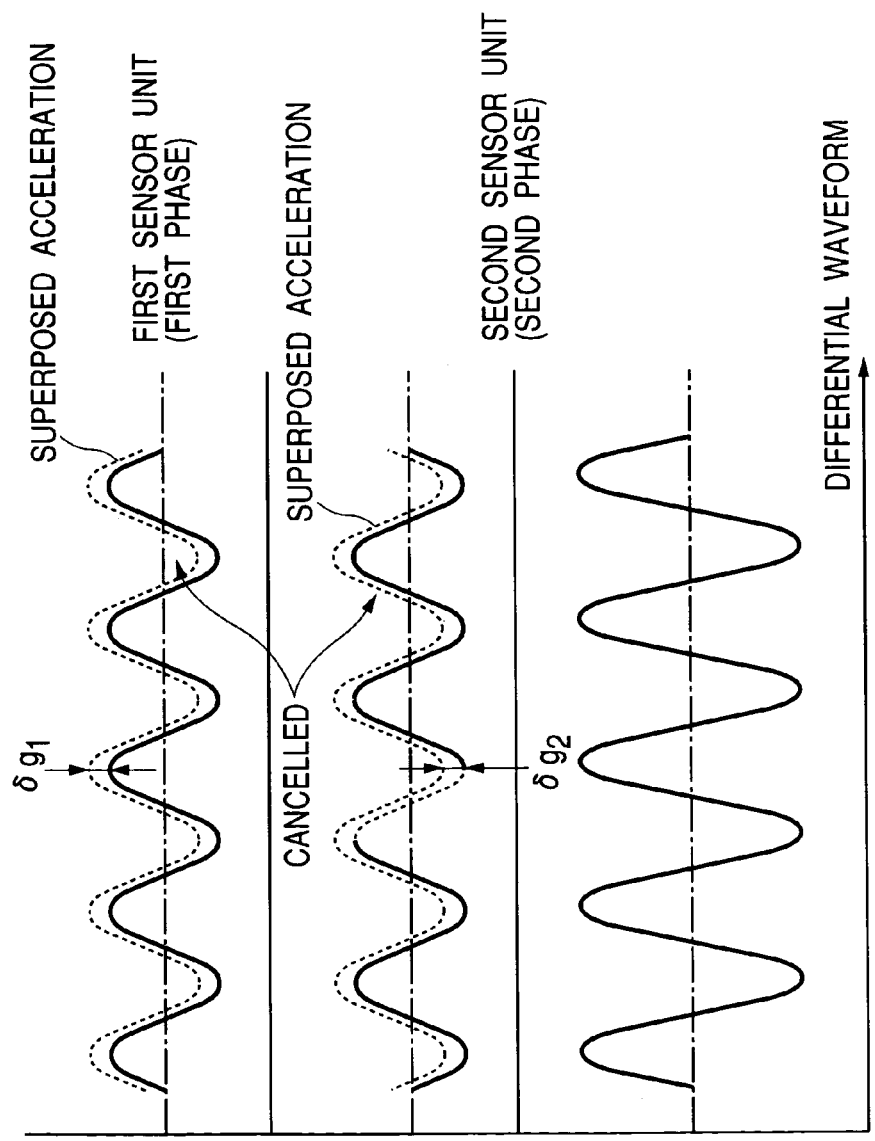

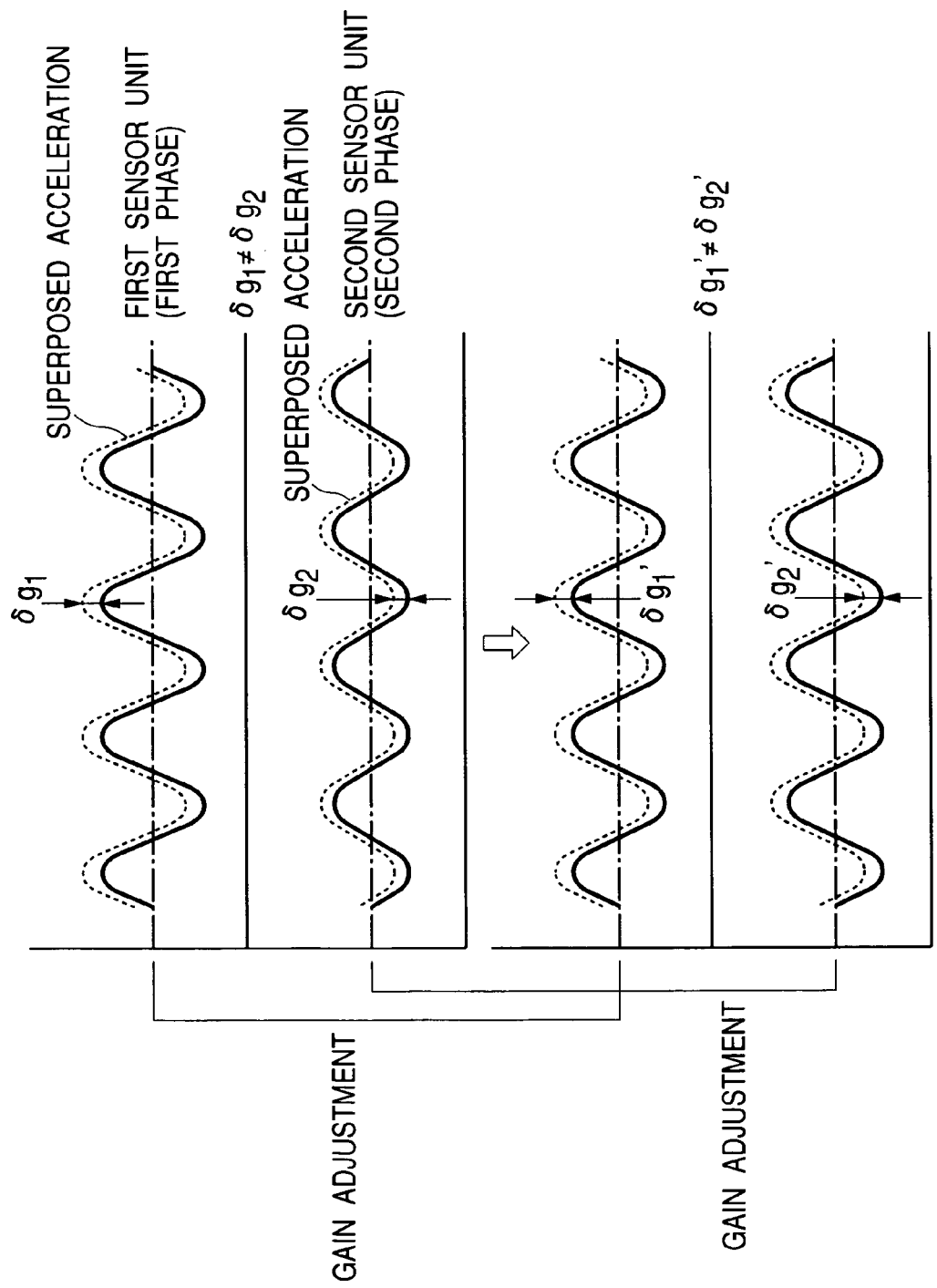

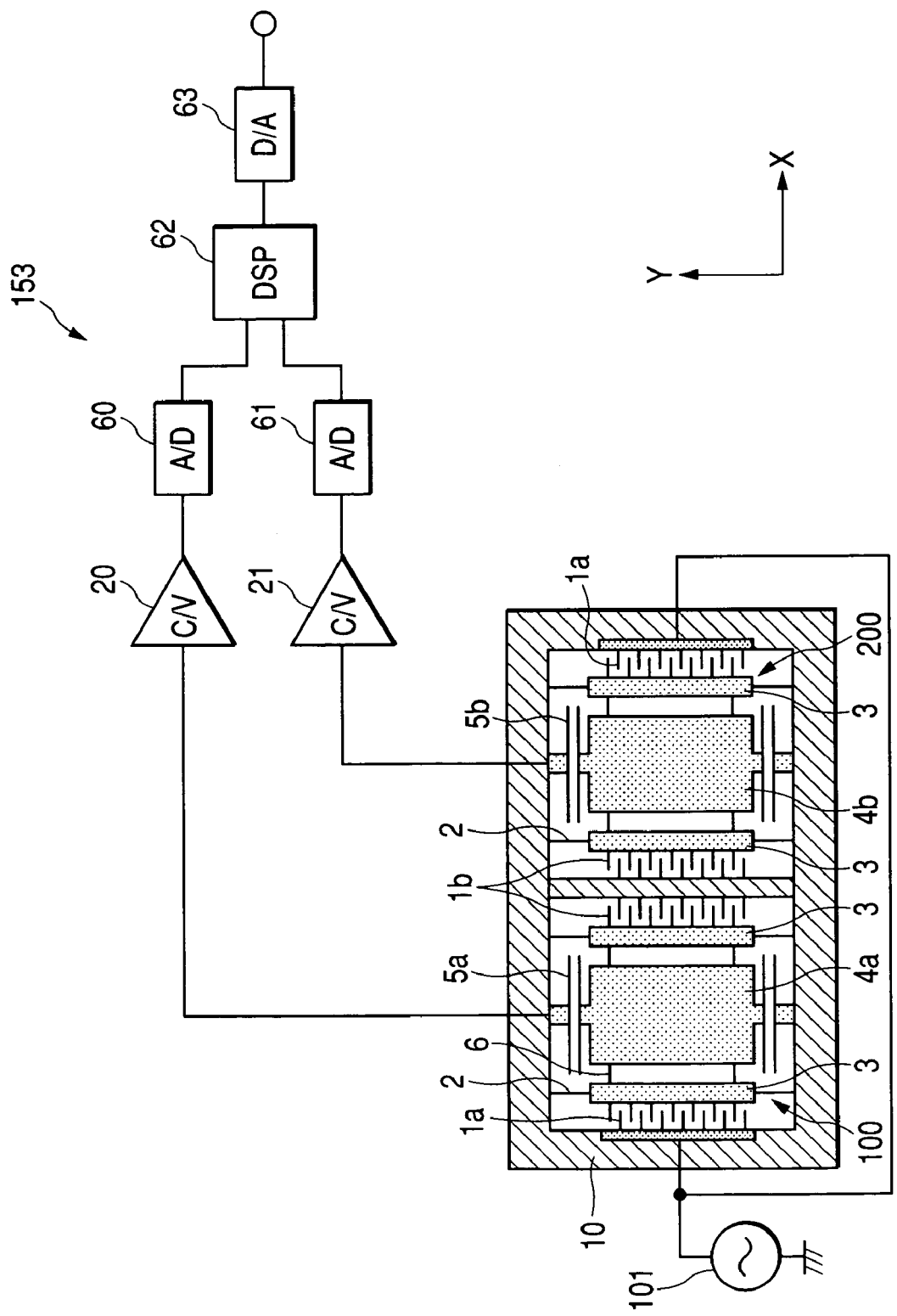

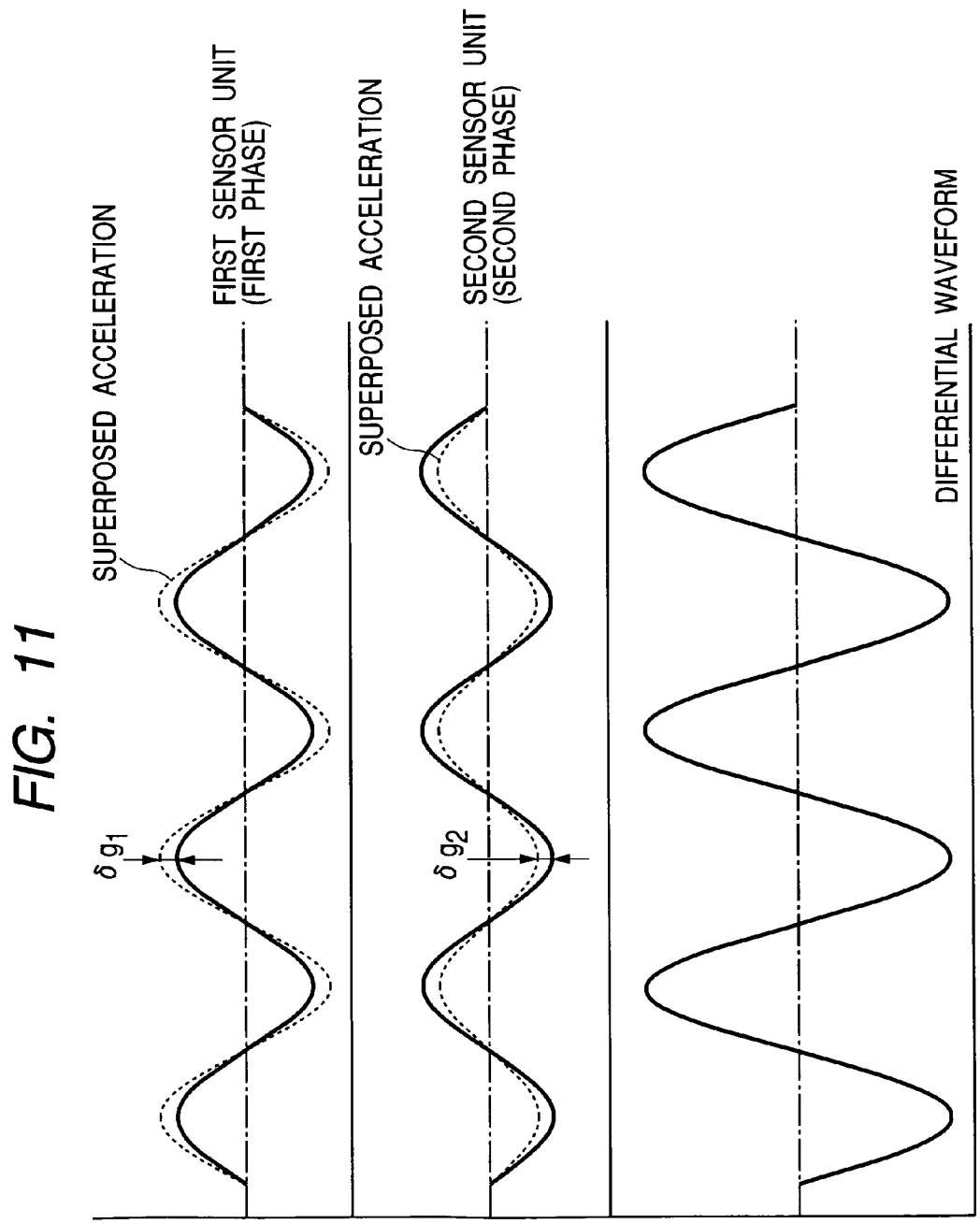

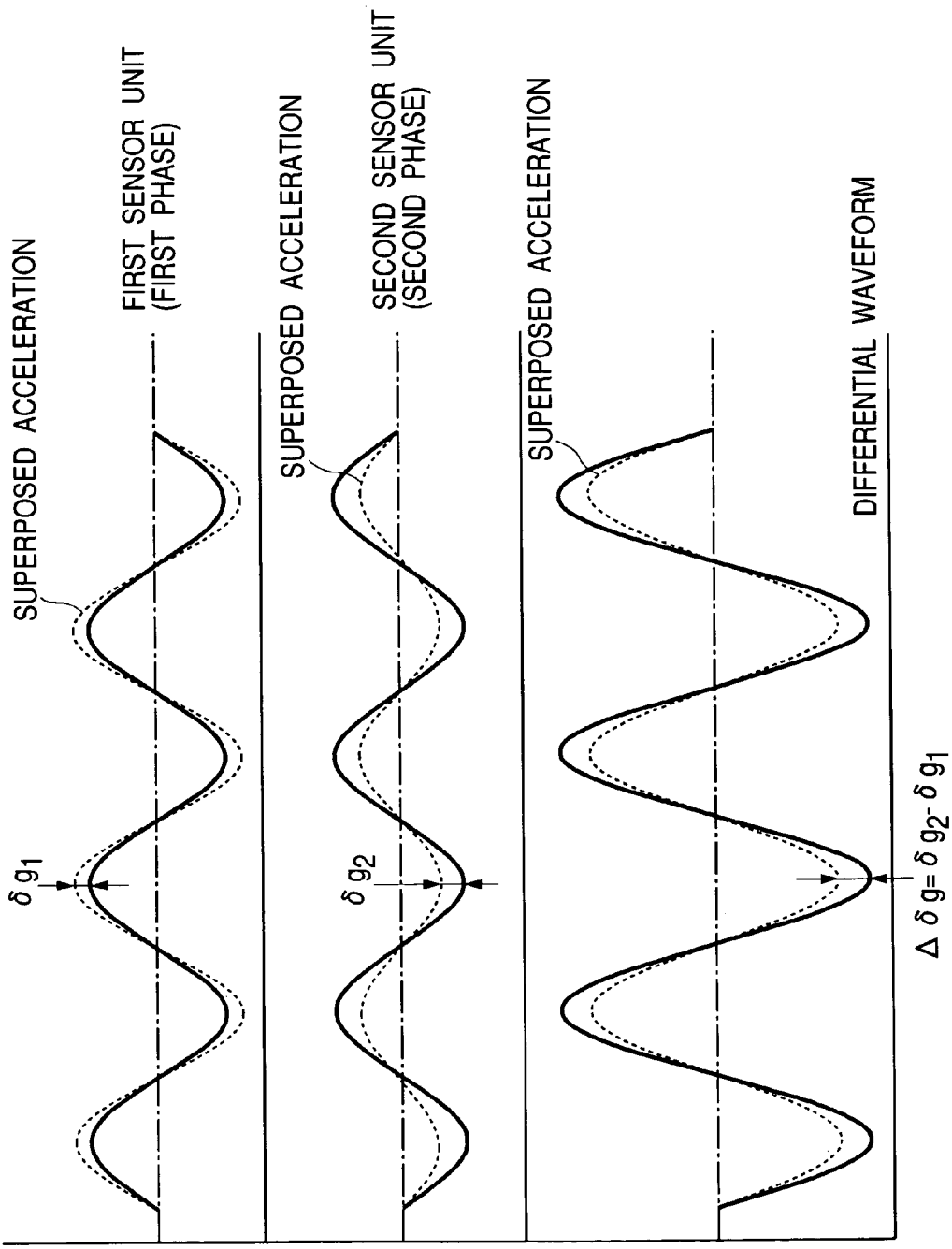

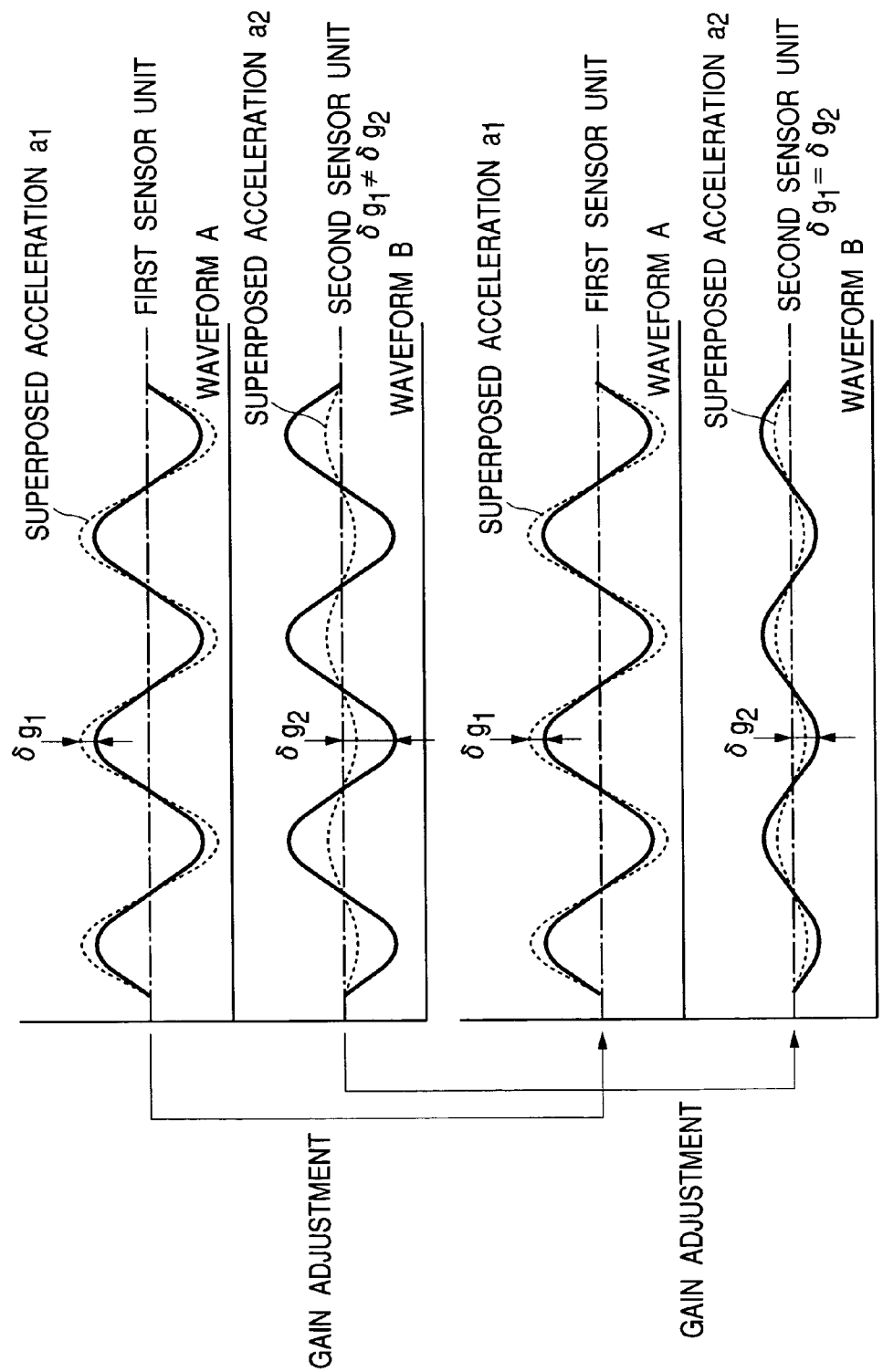

VIBRATION TYPE ANGULAR VELOCITY SENSOR

BACKGROUND OF THE INVENTION

This invention relates to a vibration type or oscillatory angular velocity sensor.

The angular velocity sensors (gyro sensors) are chiefly classified into a mechanical type utilizing the precession of a rotary body, an optical type utilizing a light-receiving timing change in accordance with the revolution of a laser beam rotating in a casing, a fluid type sensing a hot wire temperature representing an injection amount of a sensing gas changing in accordance with the rotation of a casing when the sensing gas is injected to a hot wire in the casing, and others.

On the other hand, the angular velocity sensors are recently required for detecting the traveling direction of an automotive vehicle in a car navigation system or the like. The vibration type angular velocity sensor is preferably employed in such systems because the vibration type is advantageous in cost and weight compared with the above-described other types. The vibration type angular velocity sensor has a vibrator oscillating in a predetermined reference direction and, when an angular velocity acts on this vibrator, detects a new oscillatory component based on a Coriolis force (hereinafter, referred to as an angular velocity oscillatory component) produced in a sensing direction perpendicular to the standard vibrating direction, and then outputs angular velocity information based on the detected oscillatory component. For example, according to a car navigation system, monitoring a present position based on a GPS (Global Positioning System) enables to sense a rough advancing direction of an automotive vehicle but cannot follow a sudden direction change of the vehicle at an intersection or the like. Thus, it is necessary to sense a turning motion of the vehicle based on the angular velocity. In this case, the turning directional angle is calculated by integrating momentary values of the angular velocity However, the vibrator's motion components detected by the above-described vibration type angular velocity sensor are not always limited to the Coriolis force originating from the angular velocity. When this sensor is installed on an automotive vehicle or the like, the vibrator's motion components will include unnecessary acceleration components superposed on the Coriolis force component, such as sudden impact or any other vibrations caused by non-angular velocity factors. These unnecessary acceleration components appear as noises against the angular velocity to be sensed and accordingly deteriorate the sensing accuracy of the sensor when this sensor is used in detecting the traveling direction of the automotive vehicle.

The Japanese Patent Application Laid-open No. 2001-153659 discloses a conventional angular velocity sensor that includes two combined sensors vibrating in the standard vibrating direction with mutual opposite phases and outputs a finalized angular velocity waveform corresponding to a difference between the angular velocity oscillatory component waveforms of two sensors. When the vibrators oscillate with mutually opposite phases, the angular velocity oscillatory components detected by these vibrators are also in the mutually opposite-phase relationship. On the other hand, the above-described unnecessary acceleration components appear as in-phase components. Hence, obtaining a differential waveform can cancel these in-phase acceleration components and leave only the necessary angular velocity oscillatory components. The sensing accuracy can be increased.

However, besides the vibrator (e.g. detection weight), the vibration type acceleration sensor generally includes a vibrator driving section for actuating the vibrator (for example, comb-teeth electrodes and piezoelectric elements disclosed in the above-described prior art document) and a detecting section detecting an angular velocity oscillatory component (for example, a capacitance type displacement sensing section). These components are inevitably subjected to manufacturing errors that possibly cause sensor individual differences in their angular velocity sensing properties. The sensor individual differences cause a difference in the sensing accuracy of the in-phase acceleration components that may be detected by two combined sensors causing the above-described opposite-phase vibrations. Accordingly, some of the in-phase components will reside even if the above-described processing for obtaining the differential waveform is carried out. The angular velocity sensing accuracy will thus deteriorate.

The above-described prior art document discloses a capacitance type displacement sensing section, more specifically a vibration detecting capacitor capable of changing the distance between electrodes in response to an applied angular velocity oscillatory component. A constant bias voltage is applied to this vibration detecting capacitor. A charge amount change of the vibration detecting capacitor occurring in accordance with the change of the distance between electrodes is converted into a voltage waveform and produced as an angular velocity sensing waveform. The factors causing the difference in sensor's acceleration sensing accuracy include variation or fluctuation of the bias voltage applied to the vibration detecting capacitor. To eliminate this, the above-described prior art document proposes utilizing an imaginary short-circuit of an operational amplifier in producing a differential waveform from outputs of a plurality of sensors and supplies the voltage of a reference power source to the vibration detecting capacitors of respective sensors. According to this system, it will be possible to reduce the adverse influence given by the variation or fluctuation of the bias voltage. However, this system is not effective at all in reducing adverse influences given by the variation factors other than the bias voltage, such as the weight and size of the vibrator (e.g. detection weight), the specifications of the vibrator driving section, or the electrode area of the vibration detecting capacitor.

SUMMARY OF THE INVENTION

In view of the above-described problems, the present invention has an object to provide a vibration type angular velocity sensor that is applicable to an angular velocity sensing apparatus for outputting a differential waveform between two vibration type sensor units and is capable of reducing the difference of in-phase components appearing in the angular velocity sensing waveforms in respective sensors and also capable of reducing a residual in-phase component noise level in the differential waveform without being adversely influenced by various factors causing such variation or noise, thereby improving the angular velocity sensing accuracy.

In order to accomplish the above and other related objects, the present invention provides a vibration type angular velocity sensor including first and second sensor units each having a vibrator oscillating in a predetermined standard vibrating direction, and a sensing waveform generating section that detects an angular velocity oscillatory component generating in an angular velocity sensing direction differentiated from the standard vibrating direction when an angular velocity is applied to the vibrator and also generates an angular velocity sensing waveform based on the angular velocity oscillatory component. The first and second sensor units cause their vibrators to oscillate with mutually opposite phases in the standard vibrating direction so as to cause respective sensing waveform generating sections to generate first and second angular velocity sensing waveforms having mutually inverted phases. A differential waveform detecting means is provided for obtaining a differential waveform between the first angular velocity sensing waveform and the second angular velocity sensing waveform so as to cancel in-phase components acting to respective vibrators of the first and second sensor units in the angular velocity sensing direction. And, an input gain adjusting means is provided for adjusting at least one of an input gain of the first angular velocity sensing waveform and an input gain of the second angular velocity sensing waveform entered into the differential waveform detecting means so as to reduce a residual in-phase component of the differential waveform.

According to the above-described arrangement of the vibration type acceleration sensor in accordance with the present invention, at least one of the input gains of the first and second angular velocity sensing waveforms is adjusted beforehand in detecting the differential waveform between two sensor units by the differential waveform detecting means. Thus, the residual in-phase component of the differential waveform can be surely reduced. Thus, the present invention effectively reduces the in-phase component noise level residing in the differential waveform even if the sensing properties against unnecessary acceleration components causing these in-phase components are different in individual sensor units. Furthermore, the present invention can improve the angular velocity sensing accuracy in the detection based on the differential waveform. Furthermore, in the process of generating the angular velocity sensing waveform, executing the gain adjustment before generating the differential waveform according to the present invention is effective in greatly reducing the adverse influences caused by differences or variations originating from any other factors. It is desirable that the angular velocity sensing direction agrees with the direction of the Coriolis force (i.e. the direction perpendicular to the standard vibrating direction). However, the angular velocity sensing direction can be set to a non-perpendicular direction relative to the standard vibrating direction, as long as a projection component of the Coriolis force can be surely produced.

To improve the angular velocity sensing accuracy, it is desirable to perform the above-described gain adjustment in such a manner that the angular velocity sensing waveforms obtained from both sensor units are equalized with each other in the acceleration component level, namely, so to optimize the canceling effect of the in-phase components. The gain adjustment can be carried out for both of two sensor units or only one of them.

According to a preferable embodiment of the present invention, the differential waveform detecting means includes a differential amplification circuit that inputs analog data of the first and second angular velocity sensing waveforms, and the gain adjusting means includes an analog input gain adjusting circuit that adjusts an analog input gain of the angular velocity sensing waveform. Using the analog differential amplification circuit can simplify the circuit arrangement required for processing the differential waveform and also easily enables the real time processing. The above-described gain adjustment can be simply carried out as an analog input gain adjustment for the angular velocity sensing waveform.

The sensing waveform generating section can include a vibration detecting capacitor for changing the distance between electrodes in accordance with the angular velocity oscillatory component, a bias power source for applying a constant bias voltage to the vibration detecting capacitor, and a charge amplifier for detecting a charge amount change of the vibration detecting capacitor in accordance with the change of the distance between the electrodes when the bias voltage is applied and for converting the detected charge amount change into a voltage to output an angular velocity sensing voltage waveform. Using the charge amplifier can handle the angular velocity sensing waveform of each sensor unit as a voltage waveform. In this case, the analog input gain adjusting circuit is disposed between the charge amplifier and the differential amplification circuit for adjusting an input gain of the angular velocity sensing voltage waveform produced from the charge amplifier and entered into the differential amplification circuit. The angular velocity sensing voltage waveform is easily adjustable by using resistors. The circuit arrangement can be simplified. The degree of freedom in designing the circuit can be increased.

More specifically, the analog input gain adjusting circuit has a buffer amplifier provided at an input stage of the differential amplification circuit that inputs the angular velocity sensing waveform. At least part of a gain determining resistor of the buffer amplifier is constituted by a variable resistor. And, an output of the buffer amplifier being gain adjusted based on resistance value adjustment of the variable resistor is entered into the differential amplification circuit as the angular velocity sensing waveform having been subjected to analog input gain adjustment. According to this arrangement, the independent buffer amplifier is connected to the input side of the differential amplification circuit. The angular velocity vibration waveform produced from each sensor unit can be entered into the differential amplification circuit without adding unnecessary weighting components. Furthermore, the input level gain adjustment can be done independently in the wide region.

Furthermore, when the input level gain adjustment needs not be carried out in a wide region, it is desirable that the analog input gain adjusting circuit includes a variable resistor constituting at least part of the gain determining resistor of the differential amplification circuit, and the analog input gain adjusting circuit adjusts the analog input gain of the angular velocity sensing waveform entered into the differential amplification circuit based on resistance value adjustment of the variable resistor.

Furthermore, the analog input gain adjustment may be done only once, for example, before shipping the sensor. In this case, it is preferable that the variable resistor used for the analog input gain adjustment has a resistance value being irreversibly variable and adjustable only in a predetermined direction, so as to suppress the aging change of once adjusted value. More specifically, the variable resistor is preferably a laser trimmable resistor. When processed by the laser beam, the configuration of this laser trimmable resistor changes physically and irreversibly. The once-processed configuration of the laser trimmable resistor is stable and remains unchanged until the laser trimming processing is applied again. This is advantageous in that the resistance value and the adjusted analog input gain value can remain constant.

Furthermore, two vibration type sensor units may cause the difference not only in the in-phase component to be detected but also in the phase of the angular velocity sensing waveform. For example, in the case that the mechanical resonance characteristics of these vibrators in the angular velocity sensing direction (more specifically, the resonance characteristic frequencies) are different from each other in both sensor units, it is known from the elastic vibration theory that the vibration waveform phase changes according to the difference between an actual frequency of the vibrator and its characteristic frequency. Such differences appearing in the resonance characteristics are usually brought by the difference in the elastic coefficient between two elastic support members that allow the vibrator to oscillate relative to a fixed fulcrum. If any phase difference is produced between two angular velocity sensing waveforms, a significant differential component derived from such a phase difference will reside even after the above-described gain adjustment is carried out to adjust the in-phase component levels. Thus, the angular velocity sensing accuracy deteriorates. It is hence desirable to provide phase adjusting means for adjusting an input waveform phase at least one of the first angular velocity sensing waveform and the second angular velocity waveform to be entered into the differential waveform detecting means. The phase adjustment carried out by the phase adjusting means can reduce the phase difference before the differential waveform is generated, even if such a phase difference is produced between both waveforms. Thus, the angular velocity sensing accuracy in the detection based on the differential waveform can be improved.

Moreover, according to the vibration type angular velocity sensor of the present invention, it is possible to provide a signal processing section for each output of the first and second sensor units to remove a noise component having a frequency different from a driving frequency of the vibrator. The signal processing section can effectively remove the previously described unnecessary acceleration components residing in a frequency region far from the driving frequency. However, when the in-phase components acting to respective vibrators of the first and second sensor units include a proximity noise oscillatory component within a frequency region ranging to ±50% about the driving frequency (i.e. a frequency region having its center positioned on the driving frequency and a width of ±50% with respect to this center), the above signal processing section may not work sufficiently. Hence, it is preferable that the input gain adjusting means executes an amplitude adjustment for a sensor output waveform produced as a composite output of the angular velocity oscillatory component and the proximity noise oscillatory component, for at least one of the first and second sensor units. As a result, it becomes possible to reduce a relative amplitude difference between two proximity noise oscillatory components of respective sensor units. Especially, when the proximity noise oscillatory component is within a frequency region ranging to ±10% about the driving frequency (i.e. a frequency region having its center positioned on the driving frequency and a width of ±10% with respect to this center), it is almost impossible to remove this proximity noise oscillatory component even if the signal processing section enhances the filtering accuracy. Hence, the above arrangement brings remarkable effects.

BRIEF DESCRIPTION OF THE DRAWINGS

The above and other objects, features and advantages of the present invention will become more apparent from the following detailed description which is to be read in conjunction with the accompanying drawings, in which:

FIG. 5 is a graph explaining the principal of the in-phase component canceling processing performed in the vibration type acceleration sensor (in the case of sensor out-of-band noise);

FIG. 6 is a graph explaining the operation of the vibration type acceleration sensor in accordance with the present invention;

FIG. 10 is a circuit diagram showing a vibration type acceleration sensor in accordance with a fifth embodiment of the present invention;

FIG. 11 is a graph explaining the principal of the in-phase component canceling processing performed in the vibration type acceleration sensor (in the case of sensor in-band noise);

FIG. 12 is a graph explaining the noise residing in the sensor band in FIG. 11; and FIG. 13 is a graph explaining the operation of the vibration type acceleration sensor in accordance with the present invention (in the case of sensor in-band noise).

DESCRIPTION OF THE PREFERRED EMBODIMENTS

Preferred embodiment of the present invention will be explained hereinafter with reference to attached drawings.

Figure 1:
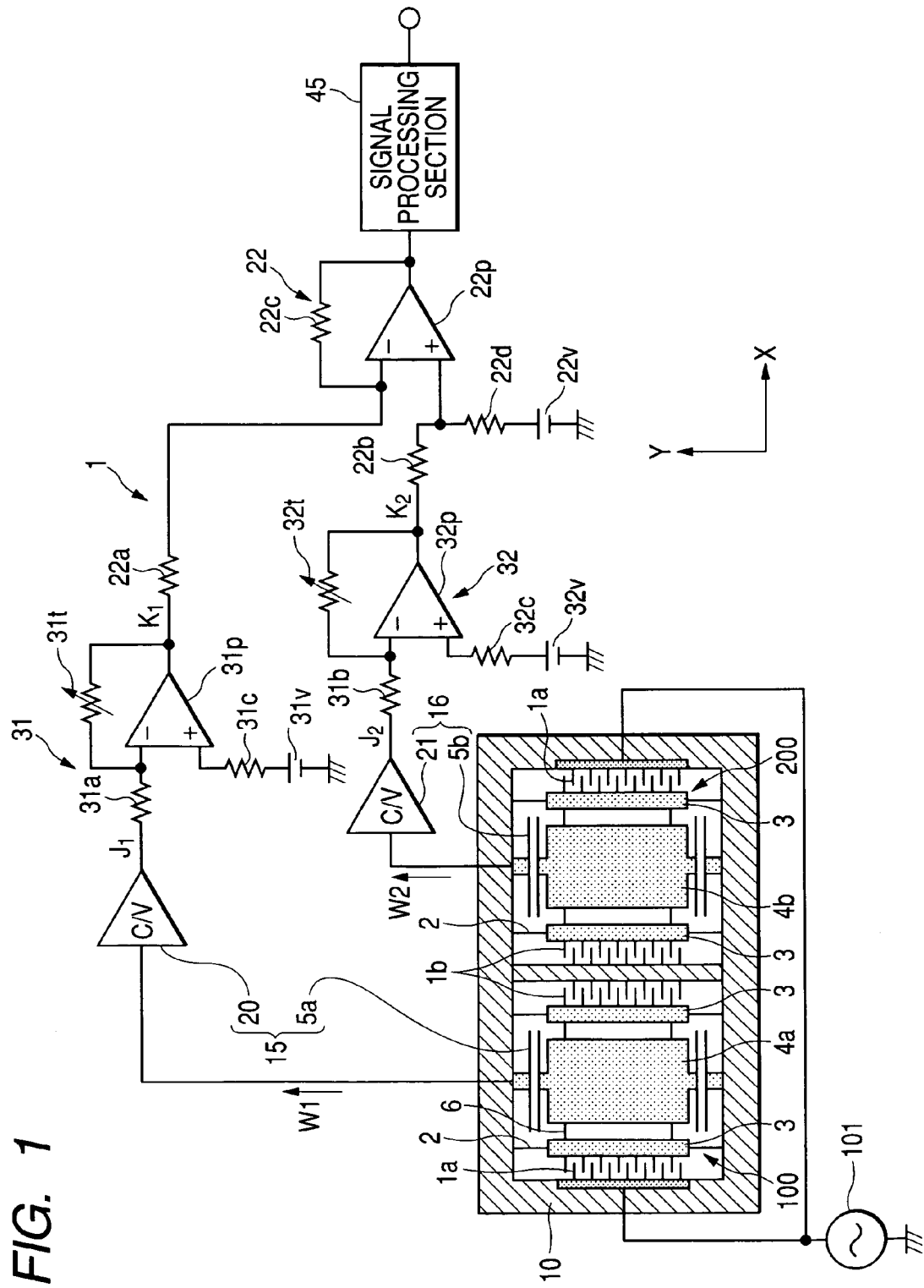
FIG. 1 is a circuit diagram showing a vibration type acceleration sensor in accordance with a first embodiment of the present invention.

FIG. 1 is a circuit diagram showing an overall arrangement of a vibration type angular velocity sensor (that may be simply referred to as an "angular velocity sensor," hereinafter) in accordance with a preferred embodiment of the present invention. The vibration type angular velocity sensor 1 has a sensing section that consists of a first sensor unit 100 and a second sensor unit 200. The first sensor unit 100 includes a vibrator (e.g. weight) 4a and a sensing waveform generating section 15, while the second sensor unit 200 includes a vibrator (e.g. weight) 4b and a sensing waveform generating sections 16. The vibrators 4a and 4b oscillate in a predetermined standard vibrating direction X. When an angular velocity is applied to respective vibrators 4a and 4b, an angular velocity oscillatory component is generated in a predetermined angular velocity sensing direction Y that is different from the standard vibrating direction X. According to this embodiment, the angular velocity sensing direction Y is perpendicular to the standard vibrating direction X. Respective sensing waveform generating sections 15 and 16 detect the angular velocity oscillatory component and generate an angular velocity sensing waveform based on the angular velocity oscillatory component.

These sensor units 100 and 200 cause respective vibrators 4a and 4b to oscillate with mutually opposite phases in the standard vibrating direction X so that the angular velocity oscillatory components appearing in the angular velocity sensing direction Y have mutually inverted phases. Accordingly, the angular velocity sensing waveforms are generated as first and second angular velocity sensing waveforms W1 and W2 that have mutually inverted phases.

The sensing waveform generating section 15 includes a vibration detecting capacitor 5a, a bias power source 4v (referred to FIG. 2) applying a constant bias voltage to the vibration detecting capacitor 5a, and a charge amplifier 20. The sensing waveform generating section 16 includes a vibration detecting capacitor 5b, a bias power source (similar to the bias power source 4v) applying a constant bias voltage to the vibration detecting capacitor 5b, and a charge amplifier 21. More specifically, each of the vibrators 4a and 4b is elastically fixed to a drive frame 3 via a beam 6 giving a vibration fulcrum so that each vibrator can oscillate in the Y direction. Furthermore, the drive frame 3 is elastically fixed to a sensor frame 10 via a beam 2 giving a vibration fulcrum so that each vibrator can oscillate in the X direction. The vibrators 4a and 4b can thus oscillate integrally with the drive frame 3 in the X direction.

Each drive frame 3 of respective sensor units 100 and 200 has movable electrodes 1b attached to its side surface. The movable electrodes 1b, each constituting a unit electrode extending in the X direction, are arrayed at constant intervals like comb teeth in the Y direction. Furthermore, the sensor frame 10 has stationary electrodes 1a provided at each side so as to be coupled with the movable electrodes 1a. The stationary electrodes 1a, each constituting a unit electrode extending in the X direction, are arrayed at constant intervals like comb teeth in the Y direction. The stationary electrodes 1a and the movable electrodes 1b are alternately overlapped with each other at their opposing distal ends.

A drive oscillating section 101 applies a drive voltage having a constant frequency F between the movable electrodes 1b and the stationary electrodes 1a. The movable electrodes 1b start vibrating relative to the stationary electrodes 1a at the frequency F in the X direction. This vibration force causes the drive frame 3 integrated with the movable electrodes 1b to oscillate. Furthermore, the vibrators 4a and 4b oscillate in the X direction (i.e. standard vibrating direction). In this case, the directions of the drive voltage applied to respective vibrators 4a and 4b are mutually opposed in the X direction in respective sensor units 100 and 200. As a result, two vibrators 4a and 4b cause mutually opposite-phase synchronous oscillations occurring in the X direction. When an angular velocity to be sensed is applied to the vibrators 4a and 4b under this condition, the vibrators 4a and 4b generate angular velocity oscillatory components according to the Coriolis force that have the amplitude representing the magnitude of the entered angular velocity and have mutually opposite phases in the Y direction.

Figure 2:
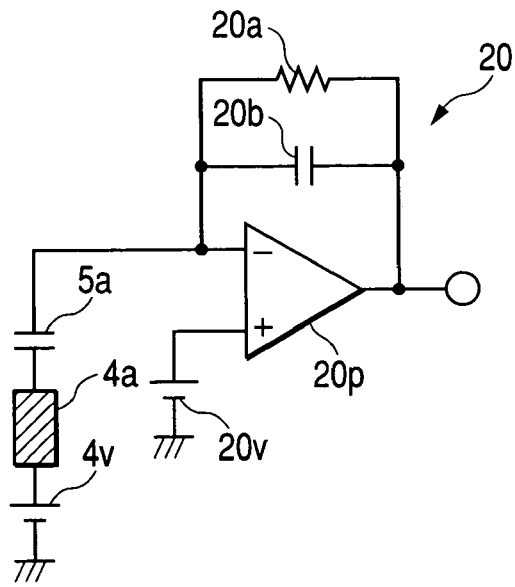
FIG. 2 is a circuit diagram showing an arrangement of the sensing waveform generating section in accordance with the a first embodiment of the present invention.

The vibration detecting capacitors 5a and 5b change an inter-electrode distance (i.e. the distance between the electrodes) in accordance with the angular velocity oscillatory component. FIG. 2 shows the first sensor unit (i.e. vibrator 4a) as a representative vibrator. According to the circuit arrangement shown in FIG. 2, the vibration detecting capacitor 5a is connected via the vibrator 4a to the bias power source 4v. A constant bias voltage is applied to the vibration detecting capacitor 5a via the vibrator 4a from the bias power source 4v. The charge amount to be stored in the vibration detecting capacitor 5a varies in accordance with a change of the inter-electrode distance of the vibration detecting capacitor 5a. The charge amplifier 20 converts the charge amount of the vibration detecting capacitor 5a into a voltage and outputs an angular velocity sensing voltage waveform. The charge amplifier 20 has a conventionally known arrangement. A negative feedback capacitor 20b, connected to the operational amplifier 20p, stores the electric charge balancing with the charge of the vibration detecting capacitor 5a. The terminal voltage of the negative feedback capacitor 20b is entered into an inverting input terminal of the operational amplifier 20p as a voltage converted charge signal. Thus, the operational amplifier 20p and the negative feedback capacitor 20b cooperatively constitute a charge voltage converting circuit that amplifies the charge of the vibration detecting capacitor 5a into a voltage and outputs an amplified voltage signal. The negative feedback resistor 20a allows the negative feedback capacitor 20b to discharge when the generate charge level of the vibration detecting capacitor 5a decreases. Furthermore, the negative feedback resistor 20a has a function of preventing the output of the operational amplifier 20p from saturating. A reference power source 20v gives an amplification reference voltage for the charge amplifier 20.

Returning to FIG. 1, the differential amplification circuit 22 inputs analog values of the first and second angular velocity sensing waveforms produced from respective charge amplifiers 20 and 21. The differential amplification circuit 22 consists of an operational amplifier 22p and gain determining resistor 22a, 22b, 22c, and 22d. The resistors 22a and 22b have the same resistance value (R1), while the resistors 22c and 22d have the same resistance value (R2). When the operational amplifier 22p inputs voltages K1 and K2, the operational amplifier 22p produces an output voltage of $(R2/R1) \cdot (K1-K2)$. In this case, for the purpose of simplifying the explanation, K2 involves the influence of a reference voltage given by a reference power source 22v. Thus, the differential amplification circuit 22 can amplify a difference component between both input voltages K1 and K2 with the gain R2/R1 without producing the weighting factors for input voltages K1 and K2.

Furthermore, the differential amplification circuit 22 is associated with buffer amplifiers 31 and 32 constituting analog input gain adjusting circuits as input stages for receiving the angular velocity sensing voltage waveforms J1 and J2 supplied from respective sensor units 100 and 200. The buffer amplifier 31 is arranged as an inverting amplification circuit consisting of an operational amplifier 31p and gain determining resistors 31t and 31a. Similarly, the buffer amplifier 32 is arranged as an inverting amplification circuit consisting of an operational amplifier 31p and gain determining resistors 32t and 32a. A reference power source 31v gives an amplification reference voltage via a resistor 31c to a non-inverting input terminal of the operational amplifier 31p. Similarly, a reference power source 32v gives an amplification reference voltage via a resistor 32c to a non-inverting input terminal of the operational amplifier 32p. According to this embodiment, the negative feedback resistors 31t and 32t are arranged as variable resistors. In other words, at least some of the gain determining resistors of respective buffer amplifiers 31 and 32 are variable resistors. This circuit arrangement allows the gain of respective buffer amplifiers 31 and 32 to linearly change in accordance with the setting of the resistance values of negative feedback resistors 31t and 32t.

According to the above-described circuit arrangement, the angular velocity sensing voltage waveforms J1 and J2 supplied from the sensor units 100 and 200 are output from the variable resistors 31t and 32t and entered into the differential amplification circuit 22 as the angular velocity sensing waveform having been subjected to the analog input gain adjustment. As previously described, the differential amplification circuit 22 has a constant gain (R2/R1). Thus, the buffer amplifier 31 can independently perform the adjustment of the input gain of the angular velocity sensing voltage waveform supplied from the sensor unit 100. The buffer amplifier 32 can independently perform the adjustment of the input gain of the angular velocity sensing voltage waveform supplied from the sensor unit 200. Furthermore, this input gain adjustment performed in respective buffer amplifiers 31 and 32 gives no substantial influence to the gain of the differential amplification circuit 22. It is however possible that only one of the buffer amplifiers 31 and 32 executes the gain adjustment. In this case, one of the negative feedback resistors 31t and 32t is replaced with a stationary resistor.

Figure 3A:
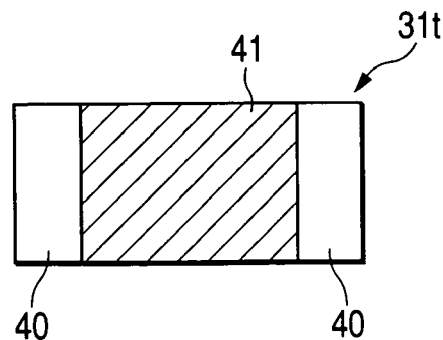
FIG. 3A is a plan view showing one example of a laser trimmable resistor in accordance with a first embodiment of the present invention.
Figure 3B:
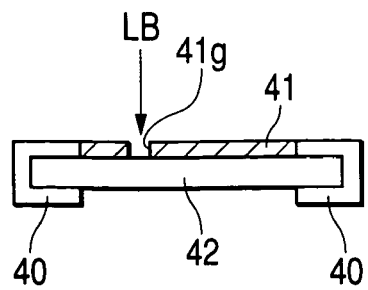
FIG. 3B is a side view showing the laser trimmable resistor shown in FIG. 3A.
Figure 4A:
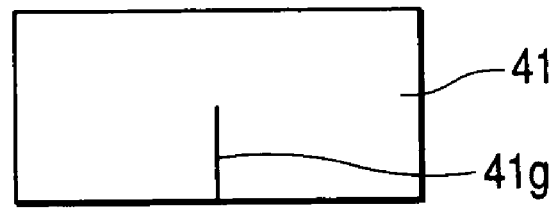
FIGS. 4A to 4D are views showing various examples of the laser trimmable resistor.
Figure 4B:
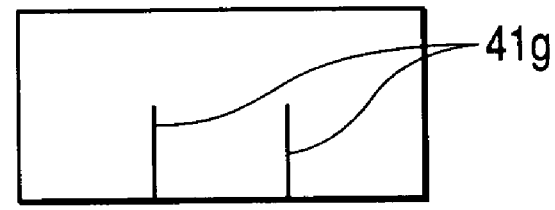
Figure 4C:
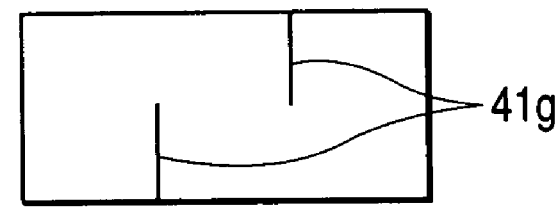
Figure 4D:
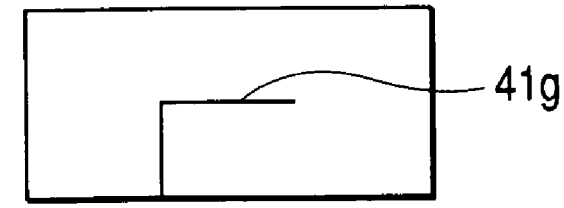

For example, the adjustment of analog input gain will be carried out only once before shipment of the sensor. Considering such circumstances, this embodiment uses laser trimmable resistors for forming the variable resistors 31t and 32t. FIGS. 3A and 3B show, as one example, a laser trimmable resistor of a surface mounting type that can be used as the variable resistor (although only the variable resistor 31t is shown). A thick resistive film 41 is formed on a main surface of a plate substrate 42, and electrodes 40 and 40 are formed at both ends of this substrate 42. A laser beam LB is irradiated on the surface of thick resistive film 41 to form a groove 41g that inhibits the electric conduction along the surface. As shown in FIGS. 4A to 4D, the formation of groove 41g is arbitrary and is various changeable in its pattern and length. The resistance value of the thick resistive film 41 is irreversibly changed and determined according to the pattern and length of the groove 41g. The formation of groove 41g reduces the substantial width of the conductive path extending between the electrodes 40 and 40 or enlarges the substantial length of the conductive path. Thus, the resistance value adjustment of the thick resistive film 41 is carried out in such a manner that the resistance substantially increases when compared with an initial condition.

Hereinafter, an operation of the angular velocity sensor 1 will be explained. As already explained with reference to FIG. 1, when an angular velocity to be sensed is applied to respective vibrators 4a and 4b under the condition that the vibrators 4a and 4b oscillate with mutually opposite phases in the X direction (i.e. in the standard vibrating direction), the angular velocity oscillatory components having mutually opposite phases are generated in the Y direction. In response to these angular velocity oscillatory components, the charge amplifiers 20 and 21 converts the charge amount change waveform produced from the vibration detecting capacitors 5a and 5b into voltages, and outputs the first and second angular velocity sensing voltage waveforms J1 and J2.

When an angular velocity acts on respective vibrators 4a and 4b vibrating in the X direction in the sensor units 100 and 200 shown in FIG. 1, the Coriolis force appearing in the Y direction changes the direction in accordance with the acceleration of respective vibrators 4a and 4b in the X direction. As the X-directional vibrations of respective sensor units 100 and 200 are opposed in their phases, the Y-directional vibrations of respective sensor units 100 and 200 resulting from the Coriolis force, i.e. sensor output waveforms, are opposed in their phases. Hereinafter, the output waveform phase of the first sensor unit 100 is referred to as a first phase while the output waveform phase of the second sensor unit 200 is referred to as a second phase. The angular velocity output waveforms produced from respective sensor units 100 and 200 are substantially identical with each other in their amplitudes as indicated by solid lines in FIG. 5 if these sensor units 100 and 200 are arranged so as to be completely equivalent to each other without being adversely influenced by later-described various variations and when unnecessary acceleration components caused by other factors are not added.

In the case that unnecessary acceleration components δg1 and δg2 are added to respective vibrators 4a and 4b, these unnecessary acceleration components δg1 and δg2 are superposed on the angular velocity sensing voltage waveforms J1 and J2 as indicated by dotted lines in FIG. 5. If the unnecessary acceleration components δg1 and δg2 are same level, these acceleration components δg1 and δg2 can be completely cancelled in the differential amplification circuit. However, the vibrators 4a and 4b shown in FIG. 1 may be slightly different in their weight and configuration. The vibration detecting capacitors 5a and 5b may be slightly different in their electrode areas or in their electrode intervals at the vibration center position. Furthermore, respective elements (e.g. electrodes 1a and 1b) constituting the driving sections of the vibrators 4a and 4b for causing the X-directional vibration may be slightly different. In such cases, the in-phase unnecessary acceleration components δg1 and δg2 may cause difference in their levels as shown in FIG. 6. If these waveforms are directly entered into the differential amplification circuit, the unnecessary acceleration components δg1 and δg2 will not be completely cancelled and accordingly will reside as part of differential waveform. In other words, the angular velocity sensing accuracy will deteriorate.

Hence, according to this embodiment, the angular velocity sensing voltage waveforms J1 and J2 are once entered into the buffer amplifiers 31 and 32 as shown in FIG. 1 to execute the gain adjustment so as to eliminate the difference between acceleration components δg1 and δg2 as shown in FIG. 6. After finishing the gain adjustment, the buffer amplifiers 31 and 32 send angular velocity sensing voltage waveforms K1 and K2 to the differential amplification circuit 22 (refer to FIG. 1). This gain adjustment can flexibly eliminate an inherent difference between the acceleration components δg1 and δg2 if resulting from the variations influenced by the above-described various factors. As a result, the acceleration components δg1 and δg2 do not reside on the differential waveform. The angular velocity sensing accuracy can be improved. Regarding the gain adjustment method, an appropriate vibrating apparatus can be used to experimentally add in-phase accelerations to respective sensor units 100 and 200. And then, the level measurement of acceleration components δg1 and δg2 can be carried out in comparison with the blank waveforms obtained when no acceleration component is added to respective sensor units 100 and 200.

The gain adjustment is carried out so as to satisfy the relationship G1/G2=δg1/δg2 when G1 represents the gain of buffer amplifier 31 and G2 represents the gain of buffer amplifier 32. According to this embodiment, the ratio Rx/Ry of the resistance values Rx and Ry of respective variable resistors 31t and 32t shown in FIG. 1 is equalized with δg1/δg2. To this end, the resistance values of respective variable resistors 31t and 32t are adjusted by laser trimming as shown in FIG. 3.

In the case that the vibration type angular velocity sensor is installed in an automotive vehicle, the previously described unnecessary acceleration components originate from the noise vibrations occurring due to various factors during the driving conditions of the automotive vehicle. Furthermore, the driving frequency F of the vibrators $4a$ and $4b$ gives the frequency of an obtained angular velocity signal. Especially, if the driving frequency F is close to the frequencies of the noise vibrations generating in the automotive vehicle driving conditions, such as frequencies of the engine vibrations and the tire vibrations, the angular velocity signal waveforms will be completely involved in these noise components. This will significantly reduce the S/N ratio of the sensor output. The frequencies of these constant noise vibrations are approximately in the level of several hundreds Hz, while the above-described driving frequency is usually set in a relatively higher region of 2 kHz to 10 kHz.

According to the above-described frequency settings, the unnecessary acceleration components originating from relatively low-frequency noise vibrations, such as the engine vibrations and the tire vibrations, have fairly long periods compared with those of the angular velocity sensing waveforms. Accordingly, these unnecessary acceleration components can be regarded as one of translational acceleration components. The waveforms of FIGS. 5 and 6 show the case that these kind of low-frequency noises are superposed. When the Y directional translational acceleration is constantly superposed, the angular velocity sensing waveform shifts its vibration center level by an amount corresponding to an added translational acceleration. Furthermore, these translational accelerations act in the same direction relative to two vibrators $4a$ and $4b$ (FIG. 1) causing mutually opposite-phase oscillations. Accordingly, the shift direction of the vibration center level due to superposition of the acceleration is the same in the angular velocity sensing waveforms of two sensor units 100 and 200.

As explained with reference to FIGS. 5 and 6, the vibration type angular velocity sensor of this invention can effectively suppress the residual low-frequency noises. However, the noises having sufficiently lower frequencies than the frequency level of the angular velocity signal to be sensed (i.e. the driving frequency of the vibrators) can be detected by other methods. Similarly, the noises belonging to the high frequencies than the frequency level of the angular velocity signal to be sensed (i.e. the driving frequency of the vibrators), such as harmonic noises, can be detected by other methods. More specifically, if the previously described gain adjustment is not carried out between these sensor units, these kinds of low-frequency or high-frequency noise components (i.e. noise components having frequencies different from the driving frequency of the vibrators; hereinafter, referred to as "sensor out-of-band noise") will not be cancelled with each other and will reside in the output of differential amplification circuit 22. However, as indicated by an alternate long and short dash line in FIG. 1, it is preferable to provide a signal processing section 45 that selectively removes the sensor out-of-band noise components at the output side of the differential amplification circuit 22. According to this embodiment, the signal processing section 45 is a synchronous detection circuit or a band-pass filter. For example, to remove these kinds of sensor out-of-band noises, a lowpass filter can be used for removing the high-frequency noises or a highpass filter can be used for removing the low-frequency noises. The signal processing section 45 has a function of removing other various sensor out-of-band noises including switching noises, background noises arriving from an alternator or the like, and harmonic noises or other noises generating due to electric factors, besides the noises originating from mechanical vibrations. Although FIG. 1 shows the signal processing section 45 provided at the output stage of the differential amplification circuit 22, it is possible to provide such a signal processing section between the buffer amplifier 31 and the differential amplification circuit 22 and also provide another signal processing section between the buffer amplifier 32 and the differential amplification circuit 22.

On the other hand, when the automotive vehicle is traveling, noise vibrations having frequencies relatively close to the driving frequency of the angular velocity sensors (hereinafter, referred to as proximity noise vibration) may arise. This embodiment defines the noise vibrations as proximity noise vibrations when these noise vibrations are within a predetermined frequency region with a center positioned on the driving frequency F and a width of ±50% (especially, ±10%) with respect to this center. The frequency region covered by the signal processing section 45 is out of this frequency region. For example, when a pebble or other obstacle jumped up by a tire may collide with a metallic chassis or body and may cause shrill acoustic noises suddenly. These impact metallic acoustic noises have frequencies close to the above-described sensor driving frequency.

Furthermore, the vibrations caused by tire rotation have relatively low fundamental frequencies. When an automotive vehicle is traveling on a rough road, high frequency components corresponding to road undulation may superpose on the angular velocity signal. These high frequency components are also close to the driving frequency. Furthermore, the vehicle body structure of an automotive vehicle has various mechanical resonance modes.

Especially, some of the characteristic frequencies of compact constituent components, such as fastening parts (bolts, nuts etc.), brackets or stays, are close to the driving frequency of the angular velocity sensor In this case, the superposition of the proximity noise vibrations is not as simple as the waveform shift shown in FIGS. 5 and 6. As an example, FIG. 11 shows the amplitude change appearing in the output waveforms of respective sensor units. In this case, the proximity noise oscillatory component $\delta g1$ increases the amplitude of the output waveform of the first sensor unit 100 vibrating in the first phase while the proximity noise oscillatory component $\delta g2$ decreases the amplitude of the output waveform of the second sensor units 200 vibrating in the second phase (i.e. in the phase opposed to the first phase), or vice versa. Hereinafter, the superposition of the proximity noise vibrations will be explained simply.

First, it is now supposed that the angular velocity oscillatory component is expressed by the following equation.

$$S = A \cdot \sin(2\pi ft - \phi) \quad \text{(i)}$$

Furthermore, the proximity noise oscillatory component is expressed by the following equation.

$$N = \delta g \cdot \sin(2\pi ft - \phi n) \quad \text{(ii)}$$

When the proximity noise oscillatory component (ii) superposes on the angular velocity oscillatory component (i), its composite waveform S can be expressed by the following equation.

$$S = As \cdot \sin(2\pi ft - \phi s) \quad \text{(iii)}$$

where As and $\phi s$ are expressed by the following equations.

$$As = [A^2 + \delta g^2 - 2A \cdot \delta g \cdot \cos(\phi n - \phi)]^{1/2} \quad \text{(iv)}$$

$$\phi s = \phi + \mathrm{Tan}^{-1}[\{\delta g \cdot \sin(\phi n - \phi)\}/\{A + \delta g \cdot \cos(\phi n - \phi)\}] \quad \text{(v)}$$

As the first sensor unit 100 and the second sensor unit 200 are in the opposite-phase relationship, the phase $\phi$ in the equation (i) and the phase $\phi 2$ in the second sensor unit 200 satisfy the relationship $\phi 2 = \phi 1 - \pi$. Thus, considering the equation (iv), the amplitudes of the superposed waveforms S1 and S2 of respective sensor units 100 and 200 can be expressed by the following equations.

$$As1 = [A^2 + \delta g^2 - 2A \cdot \delta g \cdot \cos(\varphi n - \varphi 1)]^{1/2} \quad \text{(vi)}$$

$$As2 = [A^2 + \delta g^2 - 2A \cdot \delta g \cdot \cos(\varphi n - \varphi 1 + \pi)]^{1/2} \quad \text{(vii)}$$
$$= [A^2 + \delta g^2 + 2A \cdot \delta g \cdot \cos(\varphi n - \varphi 1)]^{1/2}$$

FIG. 6 shows the case that the phase $\phi n$ of the proximity noise vibration agrees with the phase $\phi 1 - \pi$ of the angular velocity oscillatory component of the second sensor unit 200. The equations (vi) and (vii) can be modified in the following manner.

$$As1 = A + \delta g \quad \text{(vi)'}$$

$$As2 = A - \delta g \quad \text{(vii)'}$$

Thus, it is apparent that the proximity noise oscillatory component $\delta g$ has a function of increasing the amplitude of one sensor output and decreasing the amplitude of the other sensor output.

As apparent from the equations (vi)' and (vii)', if both sensor units 100 and 200 are arranged to possess complete equivalency, the unnecessary acceleration component $\delta g1$ of the first sensor unit 100 originating from the proximity noise vibration will completely agree with the unnecessary acceleration component $\delta g2$ of the second sensor unit 200 originating from the proximity noise vibration, as shown in FIG. 6. Accordingly, when a differential amplitude between both waveforms is obtained in terms of As1+As2, these unnecessary acceleration components $\delta g1$ and $\delta g2$ are completely cancelled. On the other hand, it is generally difficult to remove these proximity noise oscillatory components through the filtering operation performed by the signal processing section 45 shown in FIG. 1. Hence, there is no method other than canceling these proximity noise oscillatory components between two sensor units 100 and 200 causing mutually opposite-phase oscillations.

However, in the case that these unnecessary acceleration components $\delta g1$ and $\delta g2$ disagree with each other due to the influence of previously described variations, a differential component $\Delta \delta g$ between these components $\delta g1$ and $\delta g2$ resides as shown in FIG. 12 and cannot be removed by a conventional method using the signal processing section.

However, this invention enables to perform the above-described gain adjustment. More specifically, as shown in FIG. 13, at least one of the first sensor unit 100 and the second sensor unit 200 is subjected to the amplitude adjustment of the sensor output waveform produced as a composite output of the angular velocity oscillatory component and the proximity noise oscillatory component. As a result, a relative amplitude difference between the proximity noise vibration waveform components of both sensor units can be reduced. Thus, it becomes possible to effectively suppress or eliminate the adverse influences brought by the proximity noise vibration waveform components that can not be removed by the signal processing section 45 (FIG. 1) provided in the frequency region lower than the sensor driving frequency F.

Hereinafter, angular velocity sensors having a modified embodiment in accordance with the present invention will be explained. The portions or components identical with those of the angular velocity sensor 1 disclosed in FIG. 1 are denoted by the same reference numerals and will not be explained hereinafter.

Figure 7:
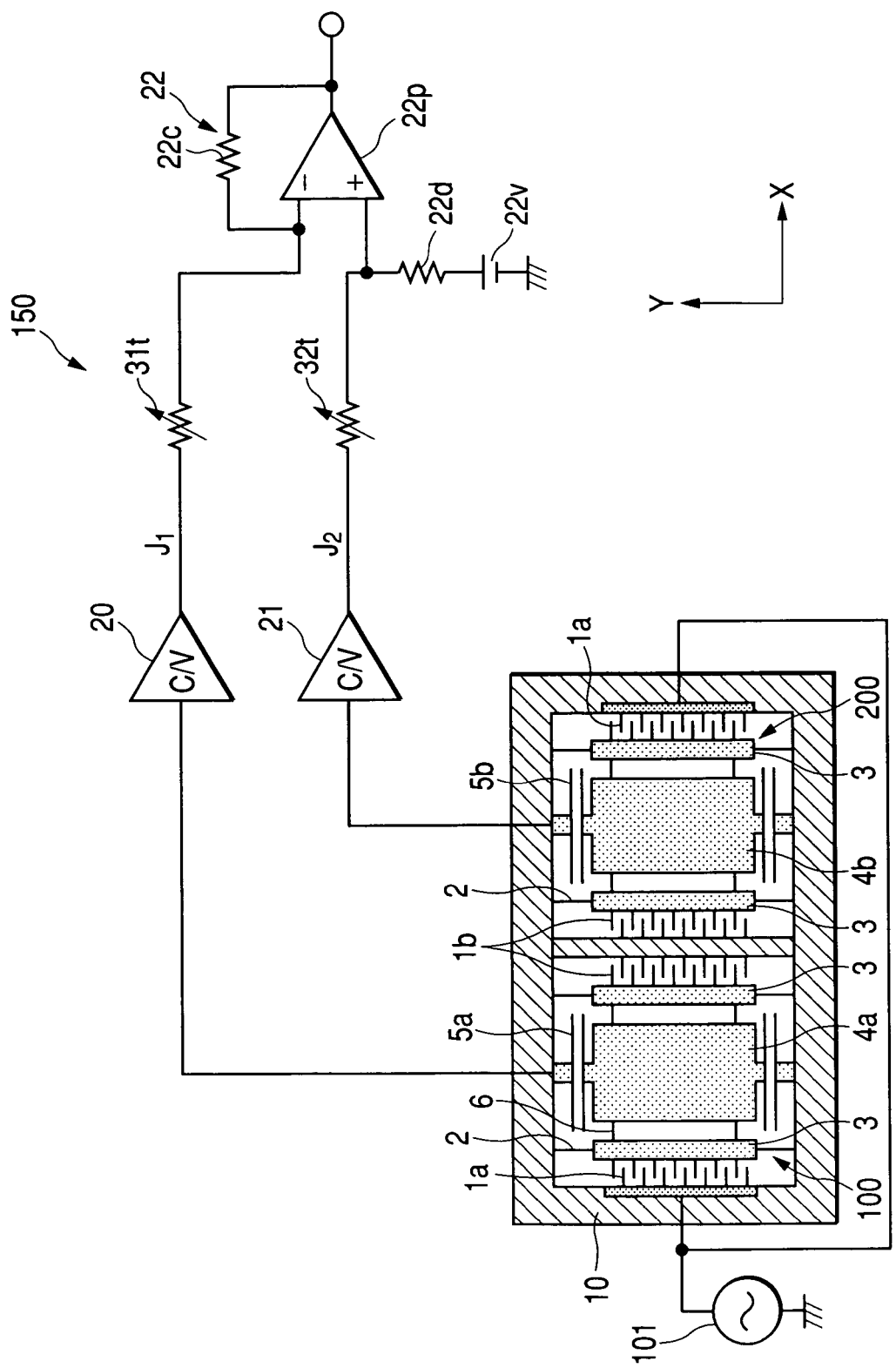
FIG. 7 is a circuit diagram showing a vibration type acceleration sensor in accordance with a second embodiment of the present invention.

According to an angular velocity sensor 150 shown in FIG. 7, the analog input gain adjusting circuit is arranged in such a manner that at least some of the gain determining resistors 31*t*, 32*t*, 22*c*, and 22*d* of the differential amplification circuit 22, e.g. input-stage resistors 31*t* and 32*t* according to this embodiment, are constituted by variable resistors (for example, the laser trimmable resistors shown in FIG. 3).

When R1, R2, R3, and R4 represent the resistance values of four gain determining resistors 31*t*, 22*c*, 32*t*, and 22*d*, the differential amplification circuit 22 produces an output V generally expressed by the following equation.

$$V = -((R1+R2)/R1) \times [\{R2/(R1+R2)\} \times J2 - \{R4/(R3+R4)\} \times J1] \quad (1)$$

From the above expression, it is understood that an overall amplification gain is expressed by (R1+R2)/R1 and weighting factors R2/(R1+R2) and R4/(R3+R4) are added to respective inputs J2 and J1. Regarding the weighting factors, it is understood that the resistance values R1 and R3 of the variable resistors 31*t* and 32*t* are independently involved in respective weighting factors. In other words, the input gain adjustment to cancel the in-phase components is feasible. Furthermore, this embodiment requires no buffer amplifiers and accordingly the circuit arrangement is very simple.

However, in the case that the input gain adjustment is carried out by changing the resistance values R1 and R3 of the resistors 31*t* and 32*t*, both of the overall amplification gain of the differential amplification circuit 22 and the weighting factors of the inputs J2 and J1 may be changed simultaneously. In this respect, the degree of freedom in the adjustment is small compared with the arrangement of FIG. 1. More specifically, the adjustment needs to be carried out so as not to give adverse influence to the overall amplification gain of the differential amplification circuit 22. To this end, in adjusting the weighting factors, i.e. in adjusting the input gain, the resistance value R3 of the resistor 32*t* is changed to adjust the input J1 because the change of resistance value R3 give no influence to the overall amplification gain as apparent from the equation (1). In this case, if the variable resistor is constituted by a laser trimmable resistor, the following problem will arise. For example, when the contribution of the in-phase component is large in the input J2 rather than in the input J1, the input gain of the input J1 must be increased. As apparent from the equation (1), the resistance value R3 needs to be decreased in this case. However, as described previously, it is impossible to reduce the resistance value of the laser trimmable resistor because the adjustment of the laser trimmable resistor is only feasible in the resistance value increasing direction. Thus, setting a large input gain for the input J1 is impossible without changing the overall amplification gain.

On the other hand, according to the arrangement shown in FIG. 1, when two variable resistors 31*t* and 32*t* are both changed, the amplification gain of the differential amplification circuit 22 (corresponding to the overall amplification gain in the arrangement of FIG. 7) is always constant. Therefore, the arrangement shown in FIG. 1 is not subjected to the above restrictions. Furthermore, setting a large input gain of the input J1 relative to the gain of the input J2 is easy.

Next, in FIG. 1, two vibration type sensor units 100 and 200 may cause a difference not only in the in-phase component to be detected but also in the phase of the angular velocity sensing waveform. More specifically, if the resonance characteristic frequencies of the vibrators 4a and 4b in the angular velocity sensing direction Y are different from each other, the phase of the vibration waveform will change in accordance with an actual frequency of the vibrator, i.e. a difference between the frequency F in the standard vibrating direction X and the above-described characteristic frequencies. The main factor influencing the resonance characteristic frequency is the variation in the elastic coefficient of the beam 2 according to the arrangement shown in FIG. 1. If two angular velocity sensing waveforms are different in their phases, the differential terms originating from such phase difference cannot be canceled even if the input gain adjustment for the differential amplification circuit 22 is carried out to adjust the in-phase component level. Accordingly, the angular velocity sensing accuracy will deteriorate.

Figure 8:
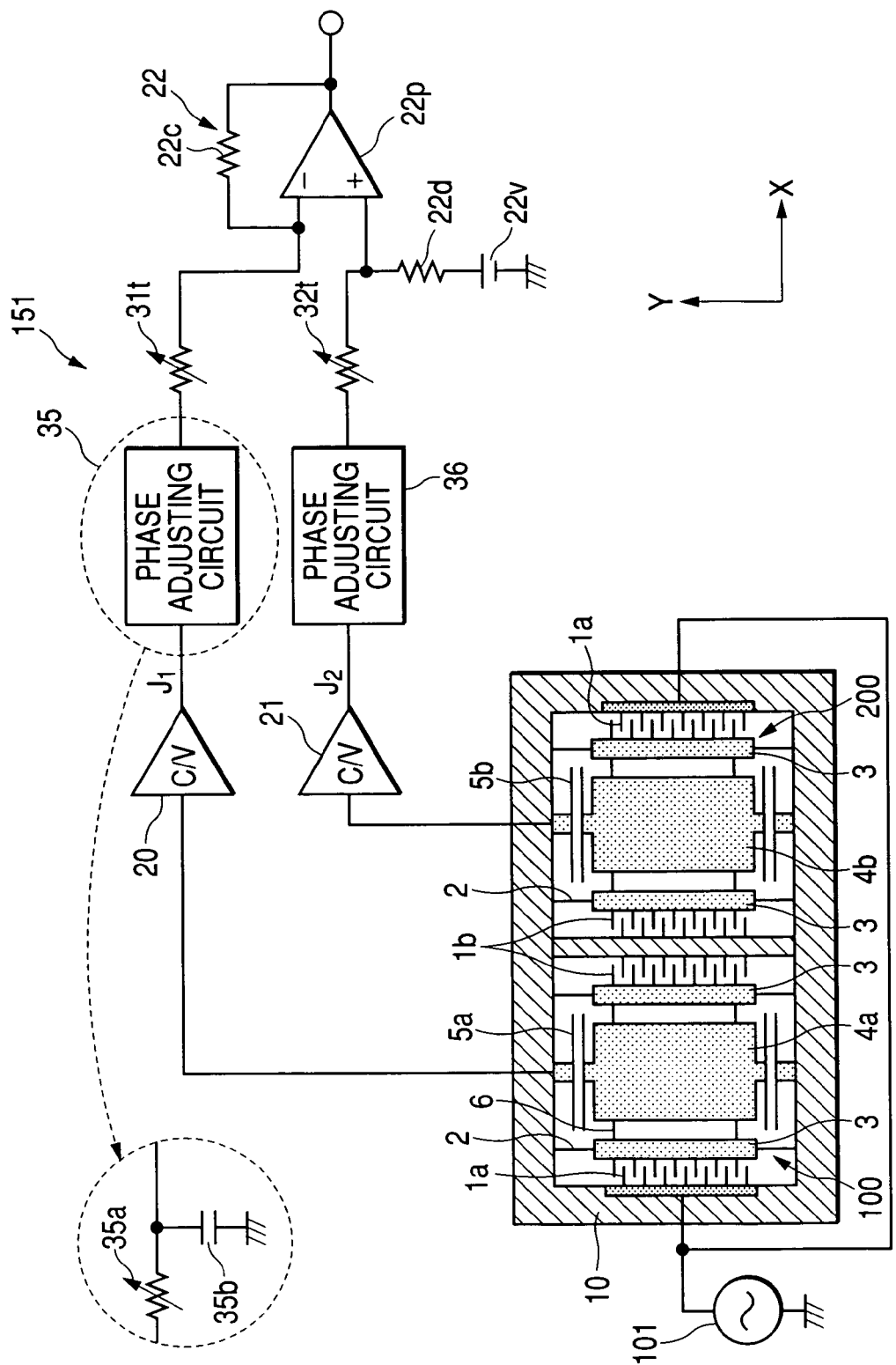
FIG. 8 is a circuit diagram showing a vibration type acceleration sensor in accordance with a third embodiment of the present invention.
Figure 9:
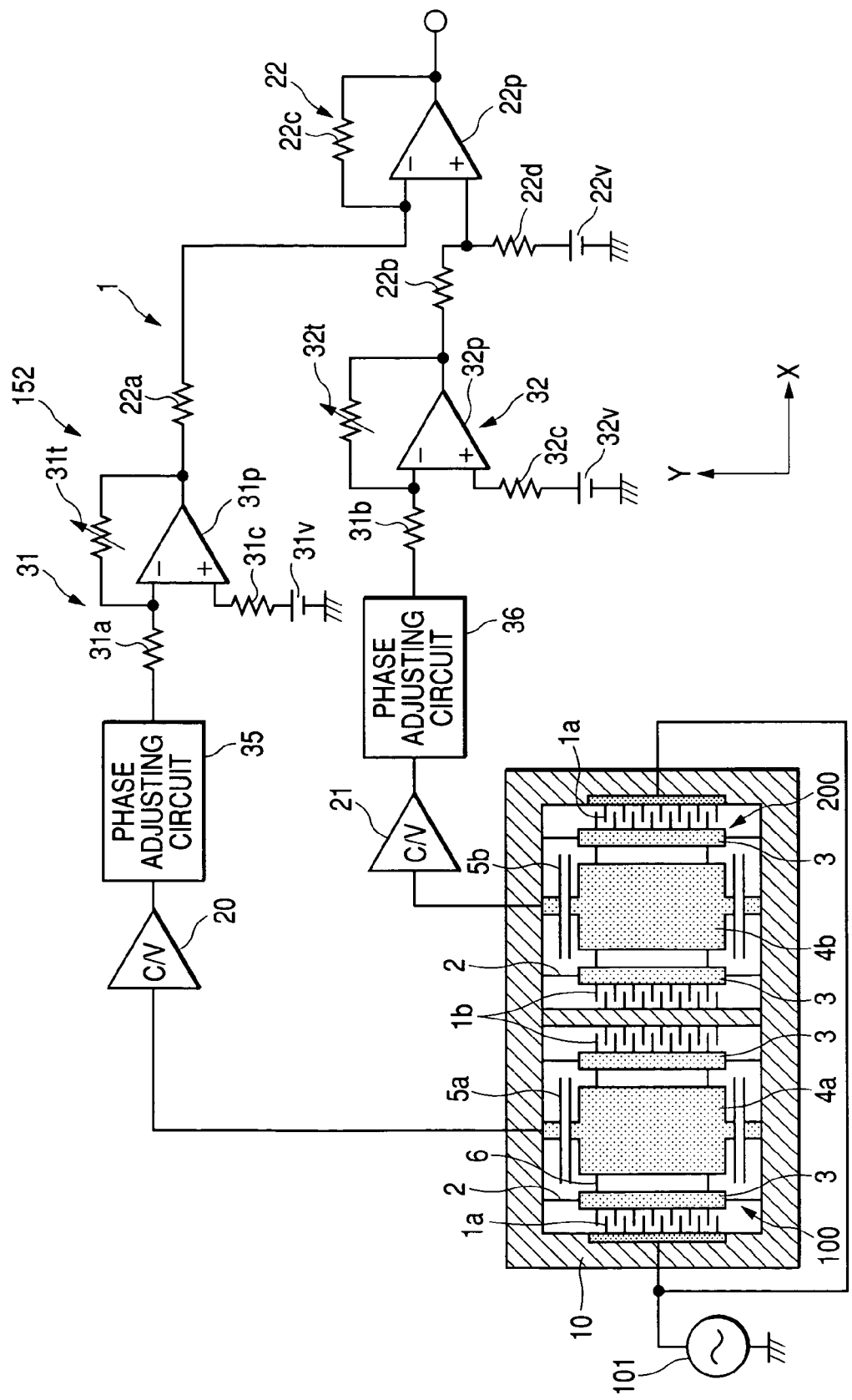
FIG. 9 is a circuit diagram showing a vibration type acceleration sensor in accordance with a fourth embodiment of the present invention.

In view of the above, an angular velocity sensor 151 shown in FIG. 8 includes phase adjusting circuits (i.e. phase adjusting means) 35 and 36 in addition to the arrangement of the angular velocity sensor 150 shown in FIG. 7. The phase adjusting circuit 35 adjusts the phase of the first angular velocity sensing voltage waveform J1 entered into the differential amplification circuit 22, while the phase adjusting circuit 36 adjusts the phase of the second angular velocity sensing voltage waveform J2 entered into the differential amplification circuit 22. Thus, even if a phase difference is caused between both waveforms, the phase adjustment can be carried out to reduce the phase difference before the differential waveform is generated. For example, an analog delay adjusting circuit is used to constitute each phase adjusting circuit. According to the embodiment shown in FIG. 8, a capacitor 35b and a discharge resistor 35a are coupled to constitute such a delay circuit. The discharge resistor 35a is a variable resistor. The delay time constant can be adjusted by varying the resistance value of the discharge resistor 35a. The phase of the waveform can be changed, too. Furthermore, an angular velocity sensor 152 shown in FIG. 9 is different from the angular velocity sensor 1 shown in FIG. 1 in that the phase adjusting circuits 35 and 36 are provided at the input stages of respective buffer amplifiers 31 and 32.

Furthermore, the above-explained analog type circuit arrangement can be replaced with a digital circuit shown in FIG. 10 in which an angular velocity sensor 153 includes A/D converting sections 60 and 61, a DSP (Digital Signal Processor) 62, and a D/A converting section 63. The A/D converting sections 60 and 61 convert the analog outputs supplied from respective charge amplifiers 20 and 21 into digital data. The DSP 62 executes the digital processing necessary for the gain adjustment of each input waveform (or phase adjustment) and for the waveform difference detection. The D/A converting section 63 converts the digital output of the DSP 62 into an analog value and generates an analog output. In this case, the DSP 62 functions as the differential waveform detecting means as well as the input gain adjusting means (or the phase adjusting means).

What is claimed is:

1. A vibration type angular velocity sensor comprising:
   first and second sensor units each having a vibrator that oscillates independently in a predetermined standard vibrating direction and a sensing waveform generating section that detects an angular velocity oscillatory component generating in an angular velocity sensing direction differentiated from said standard vibrating direction when an angular velocity is applied to said vibrator, and each waveform generating section also generates an angular velocity sensing waveform based on said angular velocity oscillatory component, said first and second sensor units causing the vibrators to oscillate with mutually opposite phases in said standard vibrating direction so as to cause the respective sensing waveform generating sections to generate first and second angular velocity sensing waveforms having mutually inverted phases,
   a differential waveform detector for obtaining a differential waveform between said first angular velocity sensing waveform and said second angular velocity waveform so as to cancel in-phase components acting to respective vibrators of said first and second sensor units in said angular velocity sensing direction, and
   an input gain adjuster for independently and variably adjusting at least one of an input gain of said first angular velocity sensing waveform and an input gain of said second angular velocity sensing waveform entered into said differential waveform detector so as to reduce a residual in-phase component of said differential waveform.

2. The vibration type angular velocity sensor in accordance with claim 1, wherein
   said differential waveform detector includes a differential amplification circuit that inputs analog data of said first and second angular velocity sensing waveforms, and said input gain adjuster includes an analog input gain adjusting circuit that adjusts an analog input gain of said angular velocity sensing waveform.

3. The vibration type angular velocity sensor in accordance with claim 2, wherein
   said sensing waveform generating section includes a vibration detecting capacitor for changing a distance between electrodes in accordance with said angular velocity oscillatory component, a bias power source for applying a constant bias voltage to said vibration detecting capacitor, and a charge amplifier for detecting a charge amount change of said vibration detecting capacitor in accordance with a change of said distance between the electrodes when said bias voltage is applied and for converting the detected charge amount change into a voltage to output an angular velocity sensing voltage waveform, and
   said analog input gain adjusting circuit is disposed between said charge amplifier and said differential amplification circuit for adjusting an input gain of said angular velocity sensing voltage waveform produced from said charge amplifier and entered into said differential amplification circuit.

4. The vibration type angular velocity sensor in accordance with claim 2, wherein
   said analog input gain adjusting circuit has a buffer amplifier provided at an input stage of said differential amplification circuit that inputs said angular velocity sensing waveform,
   at least pan of a gain determining resistor of said buffer amplifier is constituted by a variable resistor, and
   an output of said buffer amplifier being gain adjusted based on resistance value adjustment of said variable resistor is entered into said differential amplification circuit as the angular velocity sensing waveform having been subjected to analog input gain adjustment.

5. The vibration type angular velocity sensor in accordance with claim 3, wherein
   said analog input gain adjusting circuit includes a variable resistor constituting at least part of a gain determining resistor of said differential amplification circuit, and said analog input gain adjusting circuit adjusts an analog input gain of said angular velocity sensing waveform entered into said differential amplification circuit based on resistance value adjustment of said variable resistor.

6. The vibration type angular velocity sensor in accordance with claim 4, wherein said variable resistor has a resistance value being irreversibly variable and adjustable only in a predetermined direction.

7. The vibration type angular velocity sensor in accordance with claim 6, wherein said variable resistor is a laser trimmable resistor.

8. The vibration type angular velocity sensor in accordance with claim 1, further comprising a phase adjuster for adjusting an input waveform phase of at least one of said first angular velocity sensing waveform and said second angular velocity waveform to be entered into said differential waveform detector.

9. The vibration type angular velocity sensor in accordance with claim 1, wherein
- a signal processing section is provided for each output of said first and second sensor units to remove a noise component having a frequency different from a driving frequency of said vibrators,
- the in-phase components acting to respective vibrators of said first and second sensor units include a proximity noise oscillatory component within a frequency region ranging to ±50% about the driving frequency, and
- said input gain adjuster executes an amplitude adjustment for a sensor output waveform produced as a composite output of the angular velocity oscillatory component and said proximity noise oscillatory component, for at least one of said first and second sensor units, thereby reducing a relative amplitude difference between two proximity noise oscillatory components of respective sensor units.

10. The vibration type angular velocity sensor in accordance with claim 5, wherein said variable resistor has a resistance value being irreversibly variable and adjustable only in a predetermined direction.

11. The vibration type angular velocity sensor in accordance with claim 10, wherein said variable resistor is a laser trimmable resistor.

12. A vibration type angular velocity sensor comprising:
- first and second sensor units having respective vibrators oscillating in a predetermined standard vibrating direction and sensing waveform generating sections that detect an angular velocity oscillatory component generating in an angular velocity sensing direction differentiated from said standard vibrating direction when an angular velocity is applied to said vibrator, and the sensing waveform generating sections also generate an angular velocity sensing waveform based on said angular velocity oscillatory component, said first and second sensor units causing the vibrators thereof to oscillate with mutually opposite phases in said standard vibrating direction so as to cause the respective sensing waveform generating sections to generate first and second angular velocity sensing waveforms having mutually inverted phases,
- a differential waveform detector for obtaining a differential waveform between said first angular velocity sensing waveform and said second angular velocity waveform so as to cancel in-phase components acting to respective vibrators of said first and second sensor units in said angular velocity sensing direction, and
- an input gain adjuster for adjusting at least one of an input gain of said first angular velocity sensing waveform and an input gain of said second angular velocity sensing waveform entered into said differential waveform detector so as to reduce a residual in-phase component of said differential waveform, wherein said differential waveform detector includes a differential amplification circuit that inputs analog data of said first and second angular velocity sensing waveforms, and said input gain adjuster includes an analog input gain adjusting circuit that adjusts an analog input gain of said angular velocity sensing waveform, said sensing waveform generating sections include a vibration detecting capacitor for changing a distance between electrodes in accordance with said angular velocity oscillatory component a bias power source for applying a constant bias voltage to said vibration detecting capacitor, and a charge amplifier for detecting a charge amount change of said vibration detecting capacitor in accordance with a change of said distance between the electrodes when said bias voltage is applied and for converting the detected charge amount change into a voltage to output an angular velocity sensing voltage waveform, and said analog input gain adjusting circuit is disposed between said charge amplifier and said differential amplification circuit for adjusting an input gain of said angular velocity sensing voltage waveform produced from said charge amplifier and entered into said differential amplification circuit.

13. A vibration type angular velocity sensor comprising:
- first and second sensor units respectively having vibrators oscillating in a predetermined standard vibrating direction and sensing waveform generating sections that detects an angular velocity oscillatory component generating in an angular velocity sensing direction differentiated from said standard vibrating direction when an angular velocity is applied to said vibrators, and the sensing waveform generating sections also generate an angular velocity sensing waveform based on said angular velocity oscillatory component, said first and second sensor units causing the vibrators thereof to oscillate with mutually opposite phases in said standard vibrating direction so as to cause respective sensing waveform generating sections to generate first and second angular velocity sensing waveforms having mutually inverted phases,
- a differential waveform detector for obtaining a differential waveform between said first angular velocity sensing waveform and said second angular velocity waveform so as to cancel in-phase components acting to respective vibrators of said first and second sensor units in said angular velocity sensing direction, and
- an input gain adjuster for adjusting at least one of an input gain of said first angular velocity sensing waveform and an input gain of said second angular velocity sensing waveform entered into said differential waveform detector so as to reduce a residual in-phase component of said differential waveform, wherein said differential waveform detector includes a differential amplification circuit that inputs analog data of said first and second angular velocity sensing waveforms, and said input gain adjuster includes an analog input gain adjusting circuit that adjusts an analog input gain of said angular velocity sensing waveform, said analog input gain adjusting circuit has a buffer amplifier provided at an input stage of said differential amplification circuit that inputs said angular velocity sensing waveform, at least part of a gain determining resistor of said buffer amplifier is constituted by a variable resistor, and an output of said buffer amplifier being gain adjusted based on resistance value adjustment of said variable resistor is entered into said differential amplification circuit as the angular velocity sensing waveform having been subjected to analog input gain adjustment.

14. The vibration type angular velocity sensor in accordance with claim 12, wherein said analog input gain adjusting circuit includes a variable resistor constituting at least part of a gain determining resistor of said differential amplification circuit, and said analog input gain adjusting circuit adjusts an analog input gain of said angular velocity, sensing waveform intend into said differential amplification circuit based on resistance value adjustment of said variable resistor.

15. The vibration type angular velocity sensor in accordance with claim 13, wherein said variable resistor has a resistance value being irreversibly variable and adjustable only in a predetermined direction.

16. The vibration type angular velocity sensor in accordance with claim 15, wherein said variable resistor is a laser trimmable resistor.

17. The vibration type angular velocity sensor in accordance with claim 14, wherein said variable resistor has a resistance value being irreversibly variable and adjustable only in a predetermined direction.

18. The vibration type angular velocity sensor in accordance with claim 14, wherein said variable resistor is a laser trimmable resistor.

19. The vibration type angular velocity sensor in accordance with claim 1, wherein said input gain adjuster independently adjusts gain of said input gain of said first angular velocity sensing waveform and said input gain of said second angular velocity sensing waveform.

* * * * *